United States Patent [19]

Hartung

[11] 4,288,268

[45] Sep. 8, 1981

[54] METHOD OF PRODUCING A PROTECTIVE HELMET

[75] Inventor: Helmut Hartung, Mirador d'Encamp, France

[73] Assignee: Düsseldorfer Lackgrosshandlung Otto Hartung GmbH, Düsseldorf, Fed. Rep. of Germany

[21] Appl. No.: 105,076

[22] Filed: Dec. 19, 1979

[30] Foreign Application Priority Data

Dec. 23, 1978 [DE] Fed. Rep. of Germany ....... 2855967

[51] Int. Cl.³ .............................................. A42B 3/02
[52] U.S. Cl. ......................................... 156/245; 2/5; 2/6; 2/410; 2/411; 2/412; 2/425; 264/219; 264/258; 264/292; 264/294
[58] Field of Search .............. 156/212, 213, 214, 245, 156/293, 294; 264/219, 250, 254, 257, 258, 292, 294, 308, 305; 2/5, 6, 9, 410, 411, 412, 425

[56] References Cited

U.S. PATENT DOCUMENTS

| | | | |
|---|---|---|---|
| 2,448,114 | 8/1948 | Olson et al. | 2/6 |
| 2,532,442 | 12/1950 | Daly | 2/412 |
| 2,610,322 | 9/1952 | Daly | 2/412 |
| 2,630,868 | 3/1953 | Ellenberger | 156/214 |
| 4,199,388 | 4/1980 | Tracey et al. | 264/294 |

Primary Examiner—Caleb Weston
Attorney, Agent, or Firm—Erwin S. Teltscher

[57] ABSTRACT

In a method of producing a protective helmet the steps include applying a first layer of hardenable synthetic resin and fibrous tissue on a predetermined surface of a positive-type mold, thereafter tensioning the fibrous tissue, and subsequently repeating the layer-applying and tensioning steps a prearranged number of times, so as to obtain successive layers forming the protective helmet.

5 Claims, 9 Drawing Figures

U.S. Patent  Sep. 8, 1981  Sheet 2 of 2  4,288,268
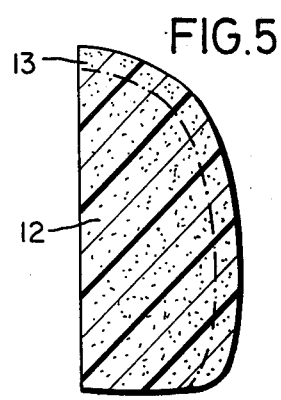
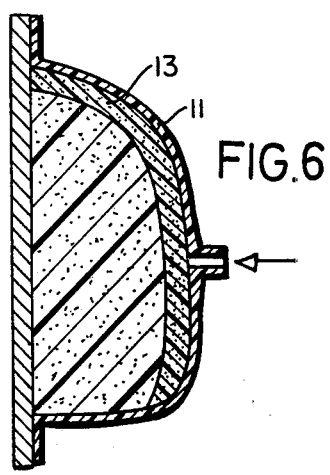
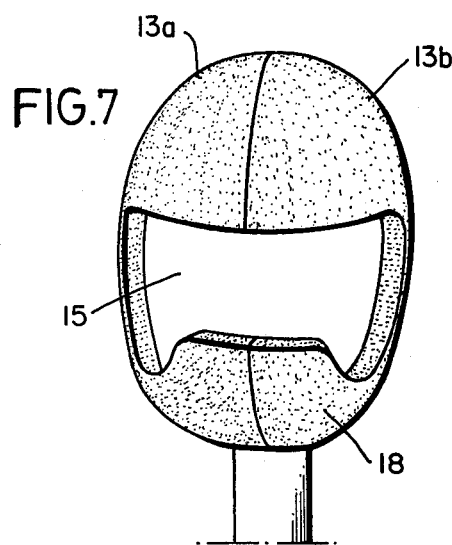
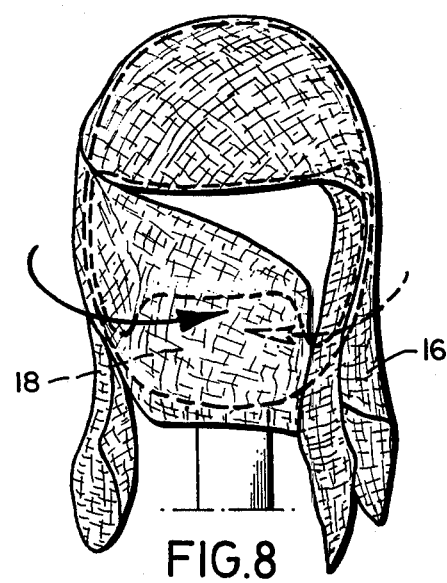
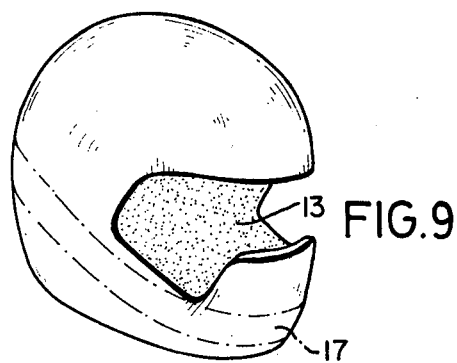

METHOD OF PRODUCING A PROTECTIVE HELMET

BACKGROUND OF THE INVENTION

The present invention relates to a method of producing protective helmets, particularly for operators of motorcycles, in which the protective helmet is formed with the aid of a positive-type mold, on which successive layers of synthetic resin and fibrous tissue are formed.

In a known method of this type there is used a negative-type mold as a foundation. In a first operating step there are applied, for example by spraying, separating means and a cover-layer of resin to the interior of the negative-type mold, which contain the basic color and simultaneously form an outermost thin layer, of the helmet to be produced. Thereafter small strips of precut glass-fiber mats, impregnated with highly viscous polyester resin and hardening means, are applied to the still moist covering layer. Up to a maximum number of nine layers of polyester-type glass fibers are manually applied to the negative-type mold, and pressed into the mold by means of special tools, so as to be free of any bubbles. The relatively large number of the individual fibrous layers, as well as the consequently resulting high degree of resin remaining in the helmert to be produced, inclusive of its outermost layer, and required both from a point of view of safety, as well as for manufacturing reasons, result in a relatively large weight of the helmet. This weight is further increased by any additional protective means required, such as an interior padding, acting as a shock absorber. Although the maximum weight for a complete protective helmet and accessories, but without a visor, is ordinarily determined by applicable test regulations, it is a helmet which has the least possible weight for a given high degree of protective quality which frequently influences a purchasing decision favorably.

In addition to the fiber-glass helmets mostly manufactured manually, there are also known helmets made of polycarbonate, produced exclusively by machine, which, as a rule, are lighter than the aforedescribed fiber-reinforced protective helmets. Although polycarbonate is a costly thermo-plastic material, which is difficult to process, helmets manufactured from polycarbonate, due to their being machine-produced, have a certain price advantage with respect to fiber-reinforced helmets. Even though the fabrication of fiber-reinforced helmets requires fewer investments in the form of machines or presses, than those needed for machine-produced helmets, such fabrication is, nevertheless, very labor-intensive, and consequently dependent on prevailing wage rates. The price- and weight-advantage of the polycarbonate helmet must be balanced against the vulnerability of its surface, to, for example, organic solvents or lacquers, and its relatively poor shock-absorbing capability; last but not least, the purchasing decision is often tipped in favor of the generally more costly and heavier fiberglass helmet for emotional reasons.

SUMMARY OF THE INVENTION

It is therefore an object of the present invention to devise a method of producing protective helmets of the aforedescribed kind, which, for a given strength and rigidity, are considerably lighter than helmets known hitherto.

This object is attained by producing a helmet with the aid of a positive-type mold, and applying a first layer of hardenable synthetic resin and fibrous tissue on a surface of the mold, thereafter tensioning the fibrous tissue, and repeating the layer-applying and tensioning steps a number of times, so as to obtain successive layers forming the protective helmet.

In this manner it is possible to fabricate an absolutely homogeneous helmet, using relatively few operating steps. The helmet produced by this inventive method has walls of precisely predetermined dimensions, and is devoid of any weak regions, due to the fibrous tissue being applied to the entire surface of the positive-type mold, without any need to either fold the fibrous tissue, or making any cuts therein. Since the helmet walls can be dimensioned so as to correspond precisely to the prevailing regulations, the weight of the helmet can be correspondingly lowered, without impairing its rigidity.

In a preferred embodiment of the invention, an additional fibrous tissue can be extended over a portion of the surface of the positive-type mold prior to the first layer-applying step, and thereafter the additional fibrous tissue can be tensioned over that portion of the surface of the positive-type mold, so as to result in at least a partially reinforced helmet. This measure particularly increases the helmet's penetration resistance within a test region thereof.

In order to increase the lateral stiffness of the helmet without substantially adding to its weight, it is advantageous, in a further development of the invention, to impregnate a fibrous belt with hardenable synthetic resin prior to the first layer-applying step, and to wrap the resin-impregnated fibrous belt around the positive-type mold; the fibrous belt may alternatively also be disposed between successive fibrous layers.

It is particularly advantageous, as far as the weight of the helmet is concerned, as well as in order to comply with prevailing technical safety regulations, if the positive-type mold is formed from hard foam, so as to obtain a shell, and following the layer-applying and tensioning steps, to leave the shell below the layers to serve as a support therefor, so that it acts as a shock-absorbing padding in the protective helmet. The so-obtained inner shell, which serves to absorb shocks, may thus be fitted in this manner to the inner surface of the helmet and results in a uniform thickness of the padding, a correspondingly low weight, and provides a maximum shock-absorbing capability in the helmet.

BRIEF DESCRIPTION OF THE DRAWING

The invention will be best understood with the aid of the accompanying drawing, in which:

FIG. 5 is an elevation view in cross-section of one part of the intermediate positive-type shell shown in FIG. 4, showing also an outer portion which is to be removed from the intermediate shell;

FIG. 6 is an elevation view in cross-section of one part of the final two-part positive-type shell, surrounded by the intermediate positive-type shell and the negative-type shell;

FIG. 7 is a perspective view of the joined two parts making up the final two-part positive-type shell;

FIG. 8 is a perspective view of the final two-part positive-type shell, with tissues being wrapped therearound; and FIG. 9 is a perspective view of the completed helmet.

DESCRIPTION OF THE PREFERRED EMBODIMENTS

Figure 1:
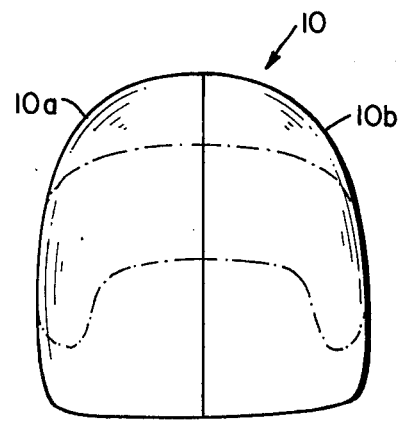
FIG. 1 is an elevational view of a massive positive-type two-part basic mold.
Figure 2:
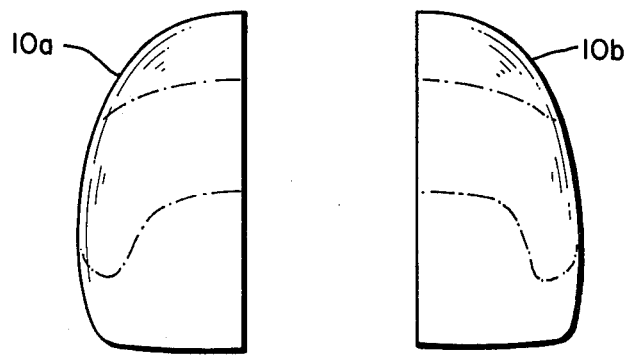
FIG. 2 is an elevation view of the two parts making up the massive positive-type basic mold shown in FIG. 1.
Figure 3:
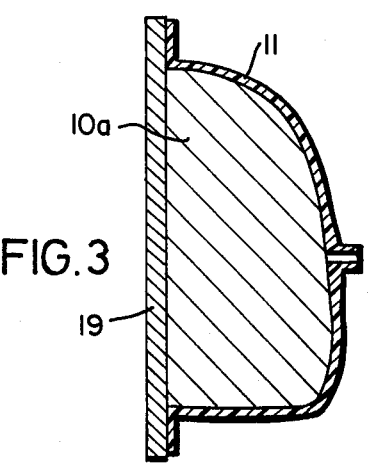
FIG. 3 is an elevational view in cross-section of a two-part negative-type shell fabricated with the aid of the basic mold of FIG. 1.
Figure 4:
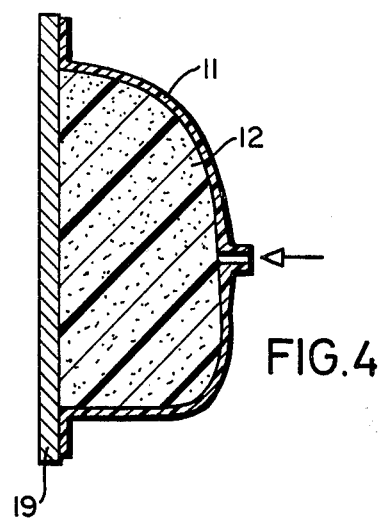
FIG. 4 is an elevation view in cross-section of an intermediate two-part positive-type shell produced with the aid of, and surrounded by, the negative-type shell shown in FIG. 3.

The invention will be further described with the aid of an example of a preferred embodiment. Although the implementation example describes the manufacture of a so-called integral helmet, the invention is of course, equally applicable to the manufacture of half-shell type helmets, or so-called jet-helmets.

In order to fabricate the protective helmet, according to the present invention, it is first necessary to obtain a preliminary massive positive-type, or male, basic mold 10 of the helmet, formed in the present example as an integral helmet. The positive-type mold is preferably made in two parts, 10a and 10b, and with its aid and that of a support plate 19, there is fabricated a split- or two-part negative-type, or female, shell or mold 11, for example from fiber-reinforced synthetic resin, the inner space of which is filled thereafter preferably with a PU (polyurethane)type hardenable foam, for example, by spraying, so as to produce an intermediate two-part polyutherane positive-type or male mold 12.

The dimensions of the so-produced intermediate two-part positive-type or male mold 12 are then reduced by an amount which corresponds to the thickness of the padding to be added later to the interior of the helmet. The space remaining between the reduced dimensions of the positive-type mold 12, and the previously fabricated negative-type shell 11 is then filled with foam, preferably, for example, by spraying PU type hardenable foam, into that space. Following hardening of the PU type hardenable foam, a final two-part positive-type mold or shell 13, composed of parts 13a and 13b, is obtained, by joining together, for example by gluing, the two half-shells, 13a and 13b, which have resulted from the hardened foam which had filled the space between the reduced two-part positive-type mold 12, and the negative-type shell 11. After cutting away appropriate portions from the resulting compound shell 13, so as to form a facial cut-out 15, the resulting shell 13 forms a base for the fabrication of the helmet proper.

The resultant compound shell 13 forms a base, on which the helmet 14 to be produced is built up. For this purpose a first thin layer of resin, preferably epoxy resin, is applied to the surface of the final positive-type mold or shell 13. A first fibrous tissue is then applied to the still moist layer of resin, for example, by extending a tissue or web 16 having dimensions approximately 100 cm by 45 cm across the final positive-type mold 13, until the final positive-type mold 13 is covered up to the upper edge of a facial cut-out 15 thereof. The tissue 16 is then gripped on the laterally overhanging ends and pulled down or tensioned without exerting any significant force, until it entirely covers the surface of the final positive-type mold 13 uniformly up to a longitudinal chin-protecting region 18 of the helmet to be built up, without forming any folds. Finally the ends of the tissue 16 are laterally folded over the longitudinal portion, which eventually forms the chin-protection region 18, so that this relatively weak region 18 is covered by two tiers of tissue 16.

After the first tissue 16 has been applied over the entire surface of the final positive-type mold or shell 13, and appropriately tensioned, it is carefully impregnated with artificial resin, and in turn covered by a second tissue 16 in the aforedescribed manner. In practice it has been shown that in general a total of five such types of tissues or webs 16 applied over the mold or shell 13 are adequate, so that the helmet produced therefrom satisfies even the most rigorous safety requirements. The fibrous tissue preferably consists of fully aromatic polyamides, known by the trademark "ARAMIDE". It is, of course, possible, to utilize other chemical fibers, for example fibers consisting of inorganic raw materials, such as glass-, metal-, or carbon-fibers, for the fabrication of the helmet 14.

So as to obtain a partial reinforcement of the helmet 14 in any endangered regions, particularly in the regions set aside for testing resistance to penetration, these regions, or portions, may be covered by an additional fibrous tissue 16 and tensioned thereafter over at least these regions or portions. As a result of applying such an additional tissue 16 to the final positive-type shell 13, it is possible to dispense with at least one of the tissues 16 covering the entire surface of the shell 13, so that the weight of the helmet to be produced is not increased by this measure.

So as to increase the frontal and lateral stability of the protective helmet, the helmet may be additionally reinforced, for example, by means of a belt 17 preferably composed of carbon fibers. Such a belt 17 may, for example, extend on the inner surface of a helmet, fabricated in an integral manner, at the level of the chin-protection region 18. A fibrous belt 17 of this type is therefore advantageously wrapped around and tensioned over the final positive-type mold or shell 13, before the first fibrous tissue 16 is applied over the entire surface of the positive-type mold or shell 13. It is alternately possible to extend such a belt 17 over any additional tissue 16 just below the first tissue 16 to be applied, and/or between any one of two successive tissues 16.

After all tissues 16 have been applied to the final positive-type mold or shell 13, the positive-type shell 13 is left below all layers 16, so as to serve as a support therefor. Following hardening of the resin-impregnated tissues 16, the final positive-type shell 13 acts as a shock-absorbing padding in the completed protective helmet.

An integral type helmet 14 produced according to the inventive method weighs about 800 grams, inclusive of the shock-absorbing padding, but exclusive of a visor, while the lightest of the known helmets weighs at least 1100 grams.

It will be apparent that numerous variations and modifications can be made to the method of the present invention, without the exercise of any inventive ingenuity, by one skilled in the art.

I claim:

1. In a method free from heat and fluid pressures of producing a protective helmet of substantially uniform thickness with the aid of a positive-type mold having a surface region of predetermined dimensions, the steps comprising:

applying a first layer of hardenable synthetic resin and shortly thereafter a first single-piece fibrous tissue having an continuous surface area of prearranged dimensions corresponding at least to said surface region of predetermined dimensions on said surface region of said positive-type mold, so as to leave laterally overhanging tissue ends, thereafter pulling said laterally overhanging ends so as to tension said fibrous tissue, until said surface region is uniformly covered up to at least a predefined longitudinal region, said tensioning step being free from exerting any significant force on said mold, and subsequently repeating the layer-applying and tensioning steps a prearranged number of times, so as to obtain successive layers forming said protective helmet.

2. In a method as claimed in claim 1, further comprising the steps of:

extending additional fibrous tissue over a portion of said predetermined surface region prior to the first layer-applying step, and thereafter tensioning said additional fibrous tissue over said portion of said predetermined surface region, so as to result in an at least partially reinforced protective helmet.

3. In a method as claimed in claim 1, wherein said protective helmet is produced with the aid of a fibrous belt, and further comprising the steps of:

impregnating the fibrous belt with hardenable synthetic resin, and prior to the first layer-applying step, wrapping the resin-impregnated fibrous belt around the positive-type mold, so as to result in an improved lateral stiffness of the protective helmet.

4. In a method as claimed in claim 1, further comprising the steps of:

forming said positive-type mold from hardenable foam, so as to obtain a shell of which at least a major portion has a substantially hemispherically-shaped contour, which is free of any wedge-shaped edges, and following the layer-applying and tensioning steps, leaving said shell below said layers to serve as a support therefor, whereby said shell acts as a shock absorber in said protective helmet.

5. In a method as claimed in claim 1, wherein said predetermined longitudinal region of said mold includes an initially weak region, and wherein said first tissue is applied on said surface region so as to be free of the formation of any folds, and further comprising the step of thereafter folding the ends of said first tissue over said initially weak region, so as to change it into a reinforced region.

* * * * *